Figure 1:
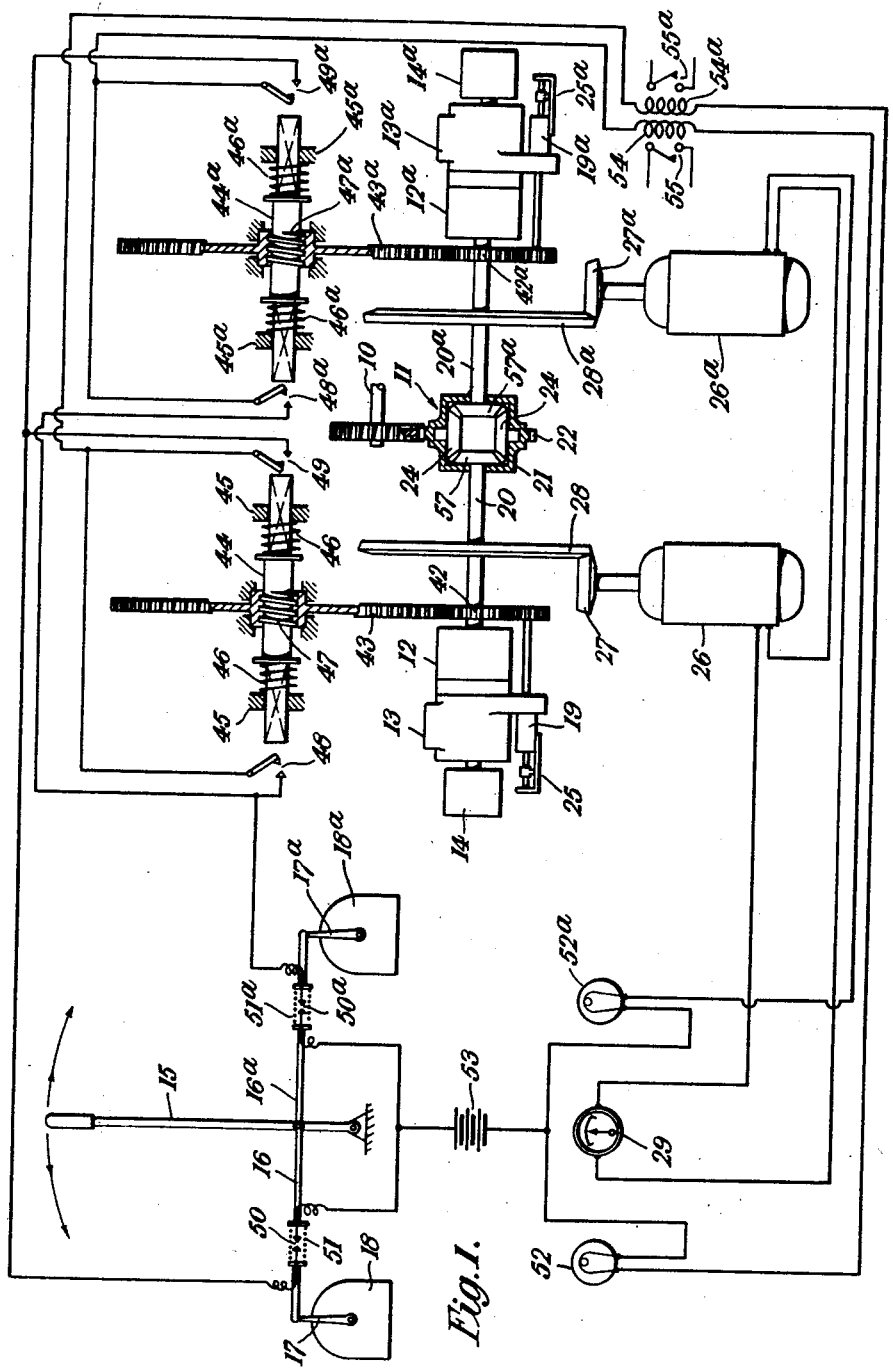

July 10, 1951  R. A. PIRIE  2,560,304
INDICATING DEVICE
Filed Sept. 23, 1948  3 Sheets-Sheet 2

INVENTOR
RONALD ANTHONY PIRIE
By MOSES, NOLTE, CREWS & BERRY
ATTORNEYS

Patented July 10, 1951

2,560,304

UNITED STATES PATENT OFFICE 2,560,304

INDICATING DEVICE

Ronald Anthony Pirie, Isle of Wight, England, assignor to Saunders-Roe Limited, Osborne, East Cowes, Isle of Wight, England Application September 23, 1948, Serial No. 50,825
In Great Britain September 25, 1947

8 Claims. (Cl. 177—311)

This invention relates to apparatus including a pair of motors arranged to drive a torque shaft through a differential gear, and an operating member movable in opposite directions to cause the motor shafts to rotate forwardly or in reverse.

One specific application of the invention is to power operated flying control systems of the kind described in United States application Serial No. 788,869, now Patent No. 2,517,680, comprising a pair of motors arranged to drive, through a differential gear, a torque shaft for operating the control surface, and a pilot's control member effective, when moved, to cause the motors to rotate the shaft by an amount and in a direction determined by the amplitude and direction of the movement of the control member.

The purpose of duplicating the motors is to ensure that, in the event of failure of one of them, the other will be available to impart movement to the power shaft, when required. In the event, however, of total failure of one of the motors, the failed motor may in some circumstances be driven in reverse by the other motor through the differential gear, with the result that no movement will be imparted to the torque shaft.

With a view to meeting this contingency the invention provides a safety device which remains ineffective so long as the motor shafts rotate in the same direction but is rendered operative, by rotation of the motor shafts in opposite directions, to give a warning signal, so that an attendant may stop the failed motor. Alternatively the safety device may be arranged itself to stop the failed motor.

In the flying control system described in United States application Serial No. 788,869, an irreversible drive is provided between each motor and the differential gear or alternatively hydraulic motors are used, each driven by a variable delivery hydraulic pump in turn driven by a constantly running electric motor, each hydraulic motor being fitted with a mechanical lock which is normally held in the free position by the fluid pressure, but which is spring loaded so as to move, in the event of pressure failure, into position to lock the motor against reverse rotation. The warning device according to the invention caters for the possibility of mechanical failure of the hydraulic motor which might occur while the fluid pressure was effective to hold the lock inoperative. In this case, the warning device would show the pilot immediately one of the motors is running in reverse, whereupon he may, by switching off the electric motor driving the pump associated with the failed hydraulic motor, cause the mechanical lock to operate, due to cutting off the hydraulic pressure, to lock the failed hydraulic motor. Alternatively, the warning system, as indicated above, may be arranged to switch off the electric motor automatically. Moreover, the warning system renders unnecessary the provision of an irreversible drive between each motor and the differential gear.

In addition to providing a warning when the motor shafts are turning in opposite directions, due to failure of one of the motors, the warning system according to the invention may also, as described later, be arranged to give a warning when either of the motors is giving a reduced output in power and speed.

Figure 2:
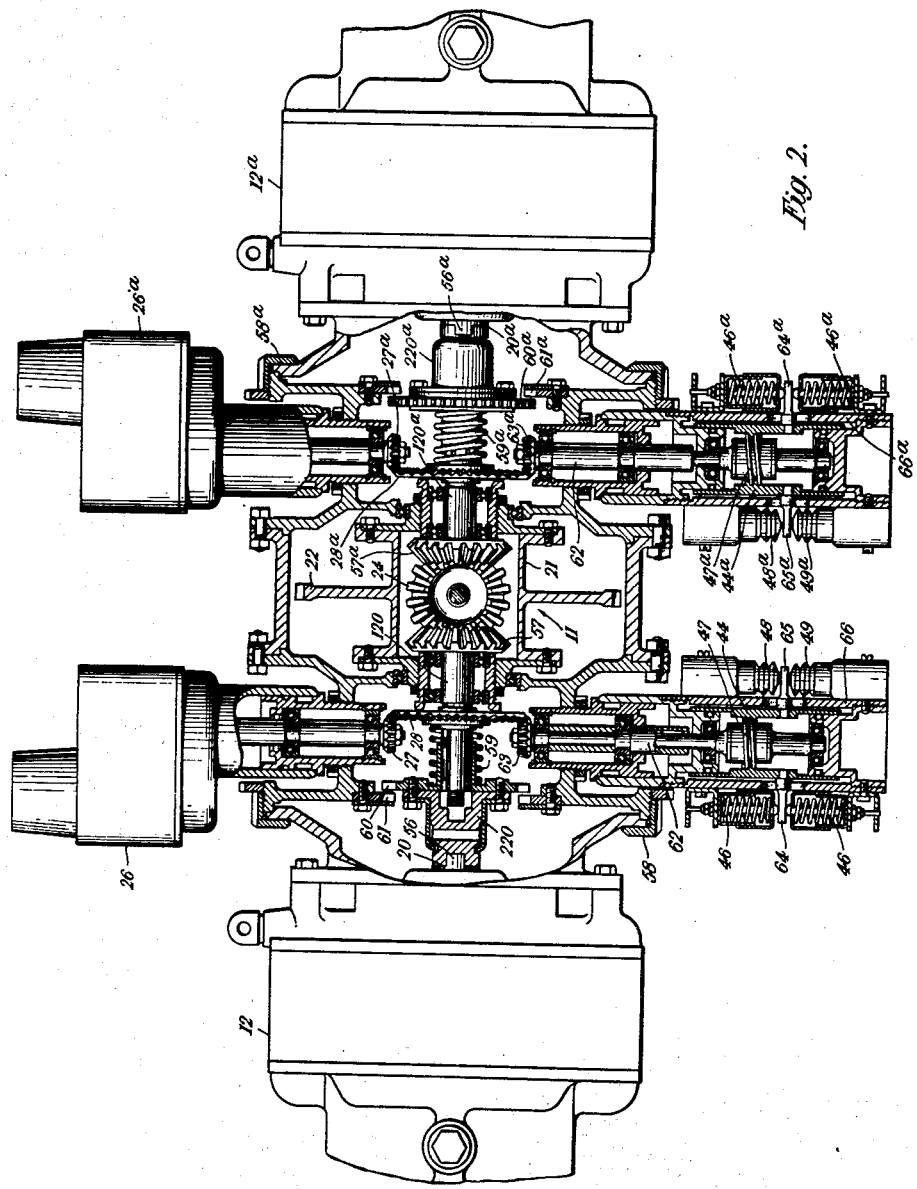
Figure 3:
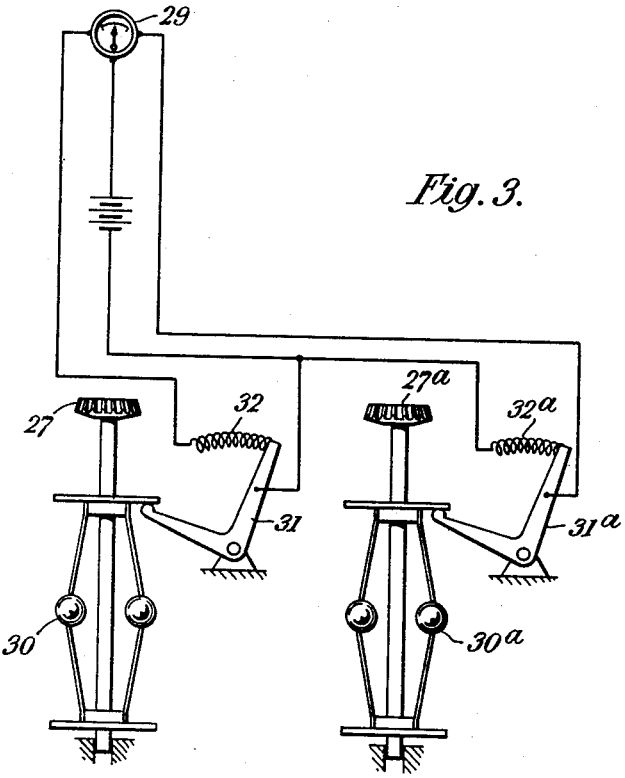
Figure 4:
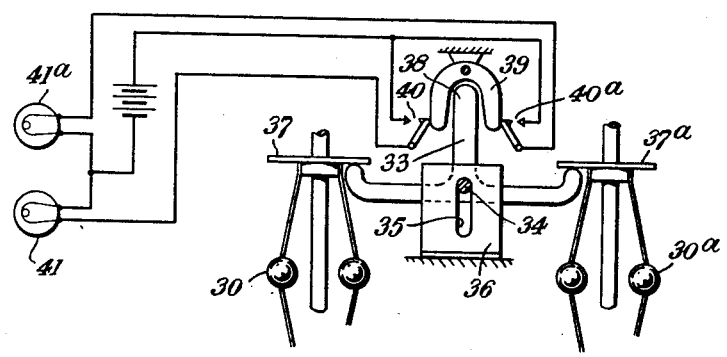

Some alternative forms of warning device for power-operated flying control systems according to the invention will now be described in detail, by way of example, with reference to the accompanying drawings in which:

Fig. 1 is a diagrammatic layout of a flying control system according to United States application Serial No. 788,869, and associated warning device, Fig. 2 is an elevation, partly in section, showing the differential gear, the motor shafts and associated members for actuating the warning device in the case of failure of either motor, and Figs. 3 and 4 are diagrams showing forms of warning device, alternative to that shown in Fig. 1, for showing the pilot when the motors are giving different outputs.

Like reference characters designate like parts throughout the figures.

As explained in United States application Serial No. 788,869 a torque shaft 10 for imparting movement to the flying control surface (e. g. an elevator) is driven, through a differential gear 11, by a pair of hydraulic motors 12, 12$^a$. Parts associated with the motor 12$^a$ bear the same reference numerals as the corresponding parts associated with the motor 12, with the suffix $a$.

The motors 12, 12$^a$ are driven by variable delivery hydraulic pumps 13, 13$^a$ which, in turn, are driven by constantly running electric motors 14, 14$^a$. The pilot's control column 15 is connected, by connecting rods 16, 16$^a$, with the operating levers 17, 17$^a$ of a pair of Selsyn transmitters 18, 18$^a$. These levers, when moved, effect corresponding movement of Selsyn receivers 19, 19$^a$ which cause the hydraulic pumps 13, 13$^a$ to commence delivery. The hydraulic motors 12, 12$^a$ then rotate their shafts 20, 20$^a$ in the same direction causing the planet carrier 21, and planet wheels 24, to rotate bodily about the axes of the motor shafts 20, 20ᵃ, thereby through gear wheels 22, 23, rotating the torque shaft 10. As described in United States application Serial No. 788,869 follow-up gears 25, 25ᵃ cause the pumps 13, 13ᵃ to cease delivery when the torque shaft 10 has executed a movement determined in magnitude and direction by the magnitude and direction of the movement of the control column 15.

It will be convenient first to describe the warning device for intimating to the pilot that the motors 12, 12ᵃ are running at different speeds. Each motor is arranged to drive a dynamo, dynamo 26 being driven from motor 12 by gear wheels 27, 28, and dynamo 26ᵃ being driven from motor 12ᵃ by gear wheels 27ᵃ, 28ᵃ. The dynamos 26, 26ᵃ are connected in a bridge circuit with a galvanometer 29 on the pilot's control panel, the galvanometer 29 giving a zero indication when the motors 12, 12ᵃ are running at equal speeds but showing a deflection to left or right from its zero indication according to which motor is failing to develop full power.

In an alternative arrangement shown in Fig. 3, the dynamos are replaced by governors 30, 30ᵃ, driven by the motors through gears 27, 27ᵃ and cooperating with pivoted contact arms 31, 31ᵃ associated with variable resistances 32, 32ᵃ and each arranged to operate one of the arms, as the speed of the associated motor changes, to vary the associated resistance accordingly. The resistances 32, 32ᵃ are connected in a bridge circuit with a galvanometer 29 which shows a zero deflection when the motors are running at the same speed and the resistances are therefore equal. Unbalance as between the speeds of the motors will render the resistances 32, 32ᵃ unequal and result in an appropriate movement of the galvanometer needle to show which of the motors is failing to develop full power.

In a third arrangement, shown in Fig. 4, the speed indicators are again governors 30, 30ᵃ and cooperate with a yoke 33 mounted on a pivot pin 34 movable in a slot 35 in a supporting member 36, which slot extends parallel to the governor spindles. When the motors are running at equal speeds collars 37, 37ᵃ on the governors, which act in cooperation with the ends of the yoke 33, maintain the latter in a central position, equal change in speed of the motors merely causing the pin 34 to travel along the slot 35. When there is difference in speed between the motors, the governors will cause the yoke 33 to rock about its pivot pin 34, whereupon an extension 38 of the yoke rocks a pivoted stirrup 39 and causes one or other of a pair of switches 40, 40ᵃ to be closed, depending on the direction in which the yoke rocks from its central position. Closing of either of switches 40, 40ᵃ lights an associated lamp 41 or 41ᵃ on the pilot's control panel. According as to which of the lamps 41, 41ᵃ is lit the pilot can tell which of the motors is running with deficient power.

The various forms of apparatus so far described are effective to show the pilot when a motor is failing to develop full power and which of the motors is so defective. They cannot, however, give an indication of total failure of the motor since the motor will then run in reverse, and the apparatus in question, in all its forms, affords an indication of motor speed only and not also of the direction of rotation of the motor shaft.

The apparatus for showing when the motor shafts are rotating in opposite directions is shown diagrammatically in Fig. 1, and in practical form in Fig. 2 and will be first explained with reference to Fig. 1.

The motor shafts 20, 20ᵃ carry gear wheels 42, 42ᵃ meshing respectively with gear wheels 43, 43ᵃ each having a screw threaded connection with one of a pair of reciprocating members 44, 44ᵃ. The members 44, 44ᵃ have squared ends passing through square holes in abutments 45, 45ᵃ and are thus held against rotation, and they are normally held in the neutral position shown by centering springs 46, 46ᵃ.

Normally the motor shafts 20, 20ᵃ will turn in the same direction, and when the motors are rendered operative, the reciprocating members 44, 44ᵃ will be caused, by the screw threads 47, 47ᵃ to move in the same direction to close, according to their direction of movement, either switches 48, 48ᵃ or switches 49, 49ᵃ. The screw threads 47, 47ᵃ are short so that after initial movement of the reciprocating members 44, 44ᵃ, the gear wheels 43, 43ᵃ become disengaged therefrom and thereafter free wheel until the direction of rotation of the motors is reversed. When this takes place the springs 46, 46ᵃ cause re-engagement of the screw threads 47, 47ᵃ to cause rapid movement of the reciprocating members 44, 44ᵃ through the neutral position and beyond it in the other direction to a position in which the gear wheels 43, 43ᵃ can again free wheel.

Each of the connecting rods 16, 16ᵃ between the pilot's control column 15 and the Selsyn transmitters 17, 17ᵃ is broken, the two halves carrying switch contacts 50, 50ᵃ normally held apart by springs 51, 51ᵃ interposed between the two halves of the rod. Whatever position the control column occupies, that switch 50 or 50ᵃ towards which it is moved will close, due to compression of its associated spring 51, or 51ᵃ, and will remain closed until the movement of the control member has ceased, whereupon the spring will open the switch by imparting slight further movement to that part of the connecting rod which is attached to the transmitter.

The arrangement is such that movement to the right of the control column 15 will cause the motors to rotate in a direction such that the reciprocating members 44, 44ᵃ move to the right, while movement to the left of the control column will cause the reciprocating members 44, 44ᵃ to move to the left.

The switches 50, 50ᵃ associated with the control column and those 48, 48ᵃ, 49, 49ᵃ associated with the reciprocating members 44, 44ᵃ are wired in circuit with a pair of warning lamps 52, 52ᵃ, one allotted to each motor, and a battery 53 in such a way that closure of the right hand control column switch 50ᵃ prepares a circuit for lighting the lamps through the left hand reciprocating member switches 48, 48ᵃ, while closure of the other control column switch 50 prepares a circuit for lighting the lamps 52, 52ᵃ through the right hand reciprocating member switches 49, 49ᵃ.

When the right hand control column switch 50ᵃ closes, the reciprocating members 44, 44ᵃ will, when both motors are operative, move to the right, closing their right hand switches 49, 49ᵃ. As at this time the left hand control column switch 50 is not closed, the lamps 52, 52ᵃ will not be lighted.

The lamps are connected in parallel, one 52 being connected across the battery 53 through the reciprocating member switches 48, 49 of the port motor 12 in parallel, and then through the right hand control column switch 50ª, and the other 52ª being connected across the battery through the reciprocating member switches 48ª, 49ª of the starboard motor 12ª in parallel and then through the left hand control column switch 50.

If, when the control column is moved to the right, the port motor 12 has failed, its reciprocating member 44 will, due to the port motor shaft 20 rotating in reverse, move to the left instead of the right, with the result that a circuit will be completed through switch 48 to light the warning lamp 52 allotted to indicate failure of the port motor. Similarly, if the starboard motor 12ª has failed, its reciprocating member 44ª will move to the left and, by closing switch 48ª, light the warning lamp 52ª allotted to indicate failure of the starboard motor.

It will be understood that the lamps 52, 52ª will be similarly lit to indicate which of the two motors has failed when the control column is moved to the left.

Instead of, or in addition to, arranging for lamps 52, 52ª to be alternatively lit to indicate to the pilot which of the two motors has failed, the circuit may include solenoids 54, 54ª arranged, when energised, to operate switches 55, 55ª. Switch 55 is operated, just as lamp 52 is lit, when the port motor 12 has failed and when switch 55 is operated it switches off the electric motor 14 driving the pump 13 associated with the port hydraulic motor 12. Similarly switch 55ª will be operated, in case of failure of the starboard motor 12ª, to switch off the electric motor 14ª driving the pump 13ª.

In the apparatus shown in Fig. 2, each motor shaft is divided into three parts, viz. a part 20 projecting from the motor casing, a part 120 driving the differential gear and carrying the gear wheel 28, and an intermediate part 220, splined to the part 120 and coupled to the part 20 by a clutch 56. When either of the motors 12, 12ª and associated parts of its power unit is removed for inspection or replacement, the associated sun wheel 57, or 57ª, is locked against rotation by an extractor lock. Removal of the power unit is effected by removal of a screwed ring 58 or 58ª. When either power unit is removed, the splined section 220 of the motor shaft is urged outwardly by a spring 59, thereby bringing a pinion 60 carried by that section into engagement with a fixed pinion 61 and locking the sun wheel 57 againts rotation.

The gear wheels 28, 28ª drive, through gear wheels 63, 63ª, shafts 62, 62ª carrying screw threads 47, 47ª engaging the reciprocating members 44, 44ª, which are constituted by sleeves each having a pair of projections 64, 65 engaging in slots in an outer casing 66, so that the reciprocating members are held against rotation. The projections 64, 64ª coact with the centering springs 46, 46ª, and the projections 65, 65ª coact with microswitches 48, 49, 48ª, 49ª.

What I claim as my invention and desire to secure by Letters Patent is:

1. In a power operated flying control system for aircraft, the combination with a pilot's operating member, a torque shaft for imparting movement to a control surface, a pair of power units each having an output shaft, a differential gear coupling said output shafts to said torque shaft, said power units being controlled by the pilot's operating member and being operative, in response to movement of said operating member and by rotating their output shafts in the same direction, to move said torque shaft in a direction, and to an extent determined by the movement of said operating member, and a normally inoperative safety device, a pair of normally open switches which are arranged to close during movement of said operating member to prepare one of a pair of electric circuits according to the direction of said movement, and to open again on cessation of movement of said operating member, and means rendered operative on actuation of said output shafts in opposite directions to complete the prepared circuit and thereby to render said safety device operative.

2. A power operated flying control system for aircraft, comprising a pilot's operating member, a torque shaft for imparting movement to a control surface, a pair of motors each having an output shaft, a differential gear coupling said output shafts to said torque shaft, said motors being operable by rotation of their output shafts in the same direction to move said torque shaft to a position determined by the movement imparted to said operating member, a pair of switch-operating members, one associated with each motor and each arranged, when the associated motor is started, to move in one of two opposite directions from a neutral position according to the direction of rotation of the output shaft of the motor, a pair of switches associated with each switch-operating member which are arranged to be operated alternatively by said member, according to its direction of movement from the neutral position, a further pair of switches arranged to be operated alternatively by the pilot's operating member when moved, according to its direction of movement, a source of current, an indicator adjacent the pilot and electrical connections between the switches, the source of current and the indicator such that the latter is non-responsive when the output shafts are rotating in the same direction but is rendered responsive, in the event of rotation in opposite directions of the output shafts, to indicate to the pilot which output shaft is rotating in the direction reverse to that selected by the movement of the pilot's operating member.

3. A power operated flying control system for aircraft as claimed in claim 2, in which each of said switch operating members is a reciprocating member, and comprising a rotary member driven by each output shaft and in screw threaded engagement with the associated reciprocating member, means for restraining each reciprocating member against rotation and springs for normally retaining said reciprocating members in neutral position, said recriprocating members being movable by the screw threads, when the motors are started, in a direction determined by the direction of rotation of the output shafts to operate the corresponding switches and the screw threads being short so that, after initial movement of the reciprocating members, the rotary members become disengaged therefrom.

4. A power operated flying control system for aircraft as claimed in claim 2, comprising a transmitter associated with each motor for operating said motor in a direction and to an extent determined by the movement imparted to the pilot's operating member, and a split connecting rod joining the pilot's operating member to each transmitter, each of said connecting rods being formed of two parts joined by a spring and one of said further switches being interposed between the two parts of each connecting rod, and the connecting rods being disposed so that the springs are selectively compressed to operate one or other of the associated switches in accordance with the direction in which said operating member is moved.

5. In a power operated flying control system for aircraft, the combination with a pilot's operating member, a torque shaft for imparting movement to a control surface, a pair of power units each having an output shaft, a differential gear coupling said output shafts to said torque shaft, said power units being controlled by the pilot's operating member and being operative, in response to movement of said operating member and by rotating their output shafts in the same direction, to move said torque shaft in a direction and to an extent determined by the movement of said operating member, an indicator, a member associated with each output shaft and arranged to move, on rotation of said output shaft, in a direction determined by the direction of such rotation, said members being ineffective on said indicator so long as they move in the same direction, and means responsive conjointly to movement of said operating member and to movement of said members in opposite directions for operating said indicator to show which output shaft is moving in the direction reverse to that selected by said operating member.

6. In a power operated flying control system for aircraft, the combination with a pilot's operating member, a torque shaft for imparting movement to a control surface, a pair of power units each having an output shaft, a differential gear coupling said output shafts to said torque shaft, said power units being controlled by the pilot's operating member and being operative, in response to movement of said operating member and by rotating their output shafts in the same direction, to move said torque shaft in a direction and to an extent determined by the movement of said operating member, a pair of normally open switches which are arranged to close during movement of said operating member to prepare one of a pair of circuits according to the direction of said movement and to open again on cessation of movement of said operating member, a member associated with each output shaft and arranged to move, on rotation of said output shaft, in a direction determined by the direction of such rotation, and means operative automatically in response to movement of said members in opposite directions to complete the prepared circuit and thereby to stop the power unit driving that output shaft which is moving in the direction reverse to that selected by said operating member.

7. A power operated flying control system for aircraft, comprising a pilot's operating member, a torque shaft for imparting movement to a control surface, a pair of motors controlled by said operating member and each having an output shaft, a differential gear coupling said output shafts to said torque shaft, said motors being operable by rotation of their output shafts in the same direction to move said torque shaft in a direction and to a position determined by the movement imparted to said operating member, a pair of switch-operating members, one associated with each motor and each arranged, when the associated motor is started, to move in one of two opposite directions from a neutral position according to the direction of rotation of the output shaft of the motor, a pair of switches associated with each switch-operating member which are arranged to be operated alternatively by said member, according to its direction of movement from the neutral position, a further pair of switches arranged to be operated alternatively by the pilot's operating member when moved, according to its direction of movement, a source of current, a normally inoperative safety device, and electrical connections between the switches, the source of current and the safety device for energizing said safety device in the event of rotation in opposite directions of the output shafts.

8. A power operated flying control system as claimed in claim 7, in which each motor is an electric motor and in which the safety device is constituted by a pair of solenoids which are selectively energized, in the event of rotation of said output shafts in opposite directions, to switch off the motor driving that output shaft which is moving in the direction reverse to that selected by the operating member.

RONALD ANTHONY PIRIE.

REFERENCES CITED

The following references are of record in the file of this patent:

UNITED STATES PATENTS

| Number | Name | Date |
|---|---|---|
| 1,091,242 | Queen et al. | Mar. 24, 1914 |
| 2,176,372 | Allen | Oct. 17, 1939 |
| 2,190,682 | Satterlee | Feb. 20, 1940 |
| 2,205,330 | Allen | June 18, 1940 |
| 2,436,341 | Weybrew | Feb. 17, 1948 |
| 2,491,842 | Weels | Dec. 20, 1949 |